Patented Sept. 5, 1950

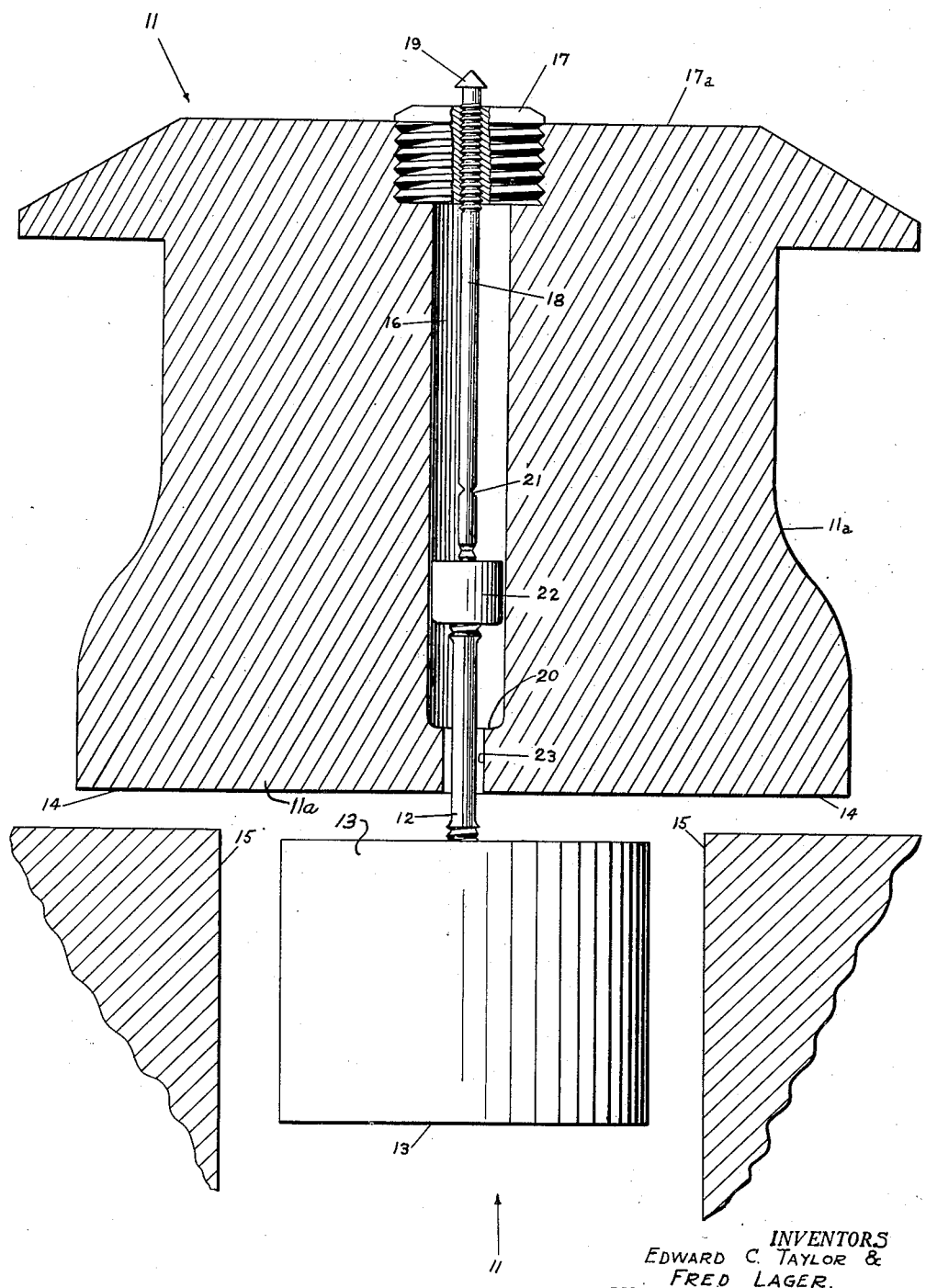

2,520,979

UNITED STATES PATENT OFFICE 2,520,979

SPECIMEN MOUNTING FOR HIGH-SPEED TENSILE TESTING

Edward C. Taylor, Valley Stream, and Fred Lager, New York, N. Y.

Application September 21, 1945, Serial No. 617,899

7 Claims. (Cl. 73—12)

(Granted under the act of March 3, 1883, as amended April 30, 1928; 370 O. G. 757)

This invention pertains to the art of testing material, and it is embodied in apparatus for testing high-speed tensile strength. The invention is embodied particularly in a device for mounting a test specimen in an impact tensile-testing machine.

According to this invention there is provided a sub-tup mounting of the specimen by means of which the tup is permitted to strike the anvil and reverse its direction before the tensile force begins to act on the test specimen.

The term sub-tup as used in the specification and claims serves to denote a subordinate tup arrangement optionally positioned within the tup and adapted to undergo a striking action within the tup assembly. The definition and scope of this term will become apparent from the following specification and drawing.

In the impact tensile testing of specimens having integral mounting of the test specimen on the tup there are two distinct drawbacks. In the first place momentum and kinetic energy measurements are complicated by the fact that a finite amount of energy is transferred between the tup and the anvil during the impact and this energy may have an appreciable effect on the calculations. In the second place it is desirable to utilize the full rebound velocity of the tup thereby permitting a higher rate of stretching of the specimen. Inasmuch as a finite time interval is involved in the impact and rebound of the tup the specimen frequently breaks before this maximum rebound velocity is realized and accordingly the full effect of the rebound velocity may not be attained.

In order to utilize the rebound velocity of the tup as a part of the draw velocity applied to the specimen it is desirable that the mass of the tup be large with sufficient momentum so as to be only slightly or gradually decelerated by the force of the specimen. On the other hand a light tup is desirable for rapid application of the change of velocity to the specimen. Both of these features can be obtained according to this invention wherein the mass of the tup itself is large and therefore the tup has a large momentum and the mass of the sub-tup is small permitting rapid reversal of motion.

It is an object of this invention to provide new apparatus for the testing of high-speed tensile strength of structural materials.

It is another object to provide apparatus for utilizing the rebound velocity of the tup in an impact testing machine.

It is an additional object to provide apparatus for testing high speed tensile characteristics of test specimens under conditions of maximum draw velocity.

It is still another object to provide apparatus for high-speed tensile tests of a specimen positioned between two objects moving freely in opposite directions.

Other objects and advantages of this invention, as well as its construction, arrangement and operation, will be apparent from the following description and claims in connection with the accompanying drawing, which presents in a single figure, a cross-sectional elevation illustrating the construction and arrangement of the apparatus of this invention.

In the drawing there is shown a tup assembly generally designated 11 in which is placed a specimen 12 which is attached to a weight 13. Near the striking surface 14 of the tup there is shown a split anvil 15 adapted and positioned to be struck by the tup.

The tup assembly 11 comprises a tup or hammer 11a having a hollow 16 extending through its center from the top of the hammer part way to its bottom. The upper portion of this hollow 16 is widened and threaded to receive a threaded plug 17 to which the specimen is attached as follows: A rod 18 having a shoulder 19, for example, adapted to be used in lifting the assembly at its upper end is threaded through the plug 17, as shown.

In the body of rod 18 and preferably near its lower extremity, there is provided a notch 21 extending substantially but not completely through the rod thereby weakening it substantially at the notch and thereby converting the rod into a fragile or frangible supporting means. The rod 18 is strong enough to support the static weight 13. The depth of the notch 21 is predetermined to weaken the rod 18 sufficiently to cause its rupture under acceleration of the weight 13 with reference to the tup 11a. When the tup 11a strikes the anvil 15, it rebounds. The tup decelerates to zero velocity and continues its deceleration until attaining its maximum velocity of rebound in reverse of its original direction of travel. The impact accordingly produces rapid acceleration of the weight 13 with reference to the tup 11a, which causes the rod 18 to rupture at the notch 21.

The lower end of the rod 18 is secured to a sub-tup 22 by conventional means such as, for example, a screw thread. The specimen 12 is secured at its one end to the sub-tup 22 in a conventional manner, and it extends from the sub-tup 22 out of the hollow or cavity 16 through hole 23 to and beyond the striking surface 14 of the tup 11a. The other end of the specimen 12 is attached to weight 13 in any suitable manner, for example, by means of screw threads.

In the use and operation of this invention to determine high-speed tensile strength, the tup assembly shown in the drawing is mounted in an impact apparatus. The tup assembly is given a high downward velocity causing the surface 14 of the tup to strike the split anvil 15 and rebound therefrom. At the moment of the impact the momentum of weight 13 causes it to continue its downward motion thereby breaking rod 18 at notch 21. The weight 13, specimen 12 and sub-tup 22 continue to travel downwardly. The tup 11a reverses its direction of motion and rebounds upward. The sub-tup 22 seats at the bottom 20 of the cavity 16, and thereafter continued travel of the tup 11a and weight 13 in opposite directions away from each other operates to apply impact tensile stress to the specimen 12.

By measuring the velocity of rebound of the tup 11a, and the velocity after impact of the weight 13, using any suitable measuring apparatus which forms no part of the present invention, the energy of impact applied by each to the specimen 12 can be computed mathematically. The applicable formula is:

$$E = \tfrac{1}{2}MV^2$$

in which

M is mass,
V is velocity and
E is energy.

During the draw, both the weight 13 and the tup 11a are moving freely in opposite directions and they cannot absorb energy from or pass energy to other parts of the testing machine. The consequent change in velocity measured under these conditions is an accurate indication of the energy absorbed by specimen 12. Also at the moment of seating of the sub-tup 22, rapid application of the velocity on the specimen 12 is obtained because of the small mass of the sub-tup; and because the tup 11a and weight 13 have at that moment maximum relative velocity.

Therefore, according to this invention, there has been provided suitable apparatus for performing high-speed tensile tests, utilizing maximum rebound velocity and permitting the elimination of error and inaccuracy caused by the loss of energy to other parts of the testing machine. Thus, by the use of this invention it is possible to determine high-speed tensile strength not only at higher draw velocities, but also at more constant draw velocities and to a greater degree of accuracy.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. For impact testing, a primary tup having a major bore, a seat in the primary tup at one end of the major bore, the primary tup having a reduced bore coaxial with the major bore and extending beyond the end thereof from the seat, a sub-tup within the major bore and movable therein into engagement with the seat, a closure for the major bore at the end thereof remote from the seat, a frangible connection between the sub-tup and the closure holding the sub-tup out of engagement with the seat.

2. Impact testing apparatus comprising the combination of a specimen assembly and an anvil, the specimen assembly comprising a tup and a weight at respective opposite ends of a specimen, the tup comprising a primary tup having a major bore, a seat in the primary tup at one end of the major bore, the primary tup having a reduced bore coaxially of the major bore at the end thereof that is proximate to the seat, a sub-tup within the major bore and movable therein into engagement with the seat, a closure for the major bore at the end thereof remote from the seat, a frangible connection between the sub-tup and the closure holding the sub-tup out of engagement with the seat, the specimen being attached to the sub-tup at its one end and extending through the reduced bore, the specimen being attached at its other end to the weight, the anvil comprising stops disposed on opposite sides of the weight.

3. For impact testing, a tup comprising a primary tup and a sub-tup movable relative to the primary tup, the primary tup comprising a seat for the sub-tup, a connection between the sub-tup and the primary tup operable to hold the sub-tup out of engagement with the seat, the connection being frangible under the stress of test impact.

4. For impact testing, a tup comprising a primary tup having a cavity, the primary tup comprising a seat at one end of the cavity, a sub-tup movable in the cavity into and out of engagement with the seat, a connection between the primary tup and the sub-tup operable to hold the sub-tup out of engagement with the seat, the connection being frangible under the stress of test impact.

5. For impact testing, a tup comprising a primary tup and a sub-tup movable relative to the primary tup, the primary tup comprising a seat for the sub-tup, a rod connecting the sub-tup and the primary tup and holding the sub-tup out of engagement with the seat, the rod being notched rendering it frangible under the stress of test impact.

6. For impact testing, a tup comprising a primary tup having an elongated cavity, the primary tup comprising a seat at one end of the cavity, a sub-tup movable along the cavity and guided thereby into and out of engagement with the seat, a rod connecting the sub-tup and the primary tup and holding the sub-tup out of engagement with the seat, the rod being notched rendering it frangible under the stress of test impact.

7. A specimen assembly for impact testing comprising a primary tup and a weight, the primary tup having a cavity and comprising a seat at one end of the cavity, the primary tup having an aperture through the seat in line with the cavity, a sub-tup movable in the cavity guided thereby into and out of engagement with the seat, the sub-tup being attached to one end of a specimen extending through the aperture, a weight attached to the specimen at its opposite end, a connection between the sub-tup and the primary tup operable to hold the sub-tup out of engagement with the seat, the connection being frangible under the stress of test impact.

EDWARD C. TAYLOR.
FRED LAGER.

REFERENCES CITED

The following references are of record in the file of this patent:

UNITED STATES PATENTS

| Number | Name | Date |
|---|---|---|
| 1,985,478 | Yuasa | Dec. 25, 1934 |
| 2,292,549 | Simmons, Jr. | Aug. 11, 1942 |
| 2,319,342 | Perrey | May 18, 1943 |